United States Patent Office 3,094,513
Patented June 18, 1963

3,094,513
SOLID-PHASE POLYMERIZATION PROCESS OF METHACRYLATE MONOMERS, CATALYZED BY ALUMINUM TRIETHYL
Edward L. Kropa, Columbus, Ohio, assignor, by mesne assignments, to W. R. Grace & Co., New York, N.Y., a corporation of Connecticut
No Drawing. Filed July 14, 1960, Ser. No. 42,752
4 Claims. (Cl. 260—89.5)

This invention is concerned with the polymerization of esters of alkacrylic acids. More particularly this invention is directed to an improvement in the polymerization of methyl methacrylate and ethyl methacrylate.

It is known that methyl methacrylate can be polymerized in the presence of aluminum triethyl in a non-polar solvent such as toluene at 0° C. See Belgian Patent 566,713. Although the resulting polymer obtained by this method is crystalline and has a softening point in excess of 100° C., the polymerization rate of the system is slow and yields are low thereby necessitating long polymerization periods which detract from the system's commercial acceptability.

Surprisingly, it has now been found possible to increase the polymerization rate and still obtain an acetone insoluble methyl methacrylate polymer with a softening point above 135° C. by initiating the polymerization in the absence of a solvent at lower temperatures whereat stereospecific polymer is formed in a solid phase, adding additional monomer and thereafter allowing the polymerization mixture to warm to at least room temperature to complete the polymerization reaction. The polymerization rate (i.e. g. polymer/g. catalyst/hr.) obtained by the instant invention is greater than that obtained by maintaining the reaction at a set temperature throughout the reaction as will be shown by examples hereinafter. Additionally, the polymerization rate in the present invention is greater than that obtained in the presence of a solvent.

Summarily this invention relates a method of increasing the polymerization rate of an acetone-insoluble methyl methacrylate polymer with a softening point above 135° C. by initiating polymerization of methyl methacrylate in the absence of a solvent in the presence of a catalyst consisting essentially of an aluminum trialkyl at a temperature in the range 0° C. to the freezing point of the catalyst-monomer polymerization mixture, maintaining the polymerization mixture at a temperature between minus 45° C. and the freezing point of the polymerization mixture to obtain a solid phase, adding additional methyl methacrylate monomer and thereafter permitting the polymerization mixture to warm to about room temperature to complete the polymerization.

The composition of the solid phase is as yet unknown. One hypothesis is that at this lower temperature (i.e. about —45° C.), the aluminum alkyl acts as a seed on which the methyl methacrylate polymer nucleates thereby forming a solid aluminum alkyl-polymer complex. Still another considers the solid phase as wholly polymer. However, I do not wish to be bound by any theory. Suffice it to say that polymerizing methyl methacrylate in the absence of a solvent in the presence of an aluminum alkyl catalyst at a temperature of about minus 45° C. until a solid phase is formed, adding additional monomer and thereafter allowing the reaction temperature to increase to at least room temperature while maintaining a solid phase present results in a high polymerization rate whereby an acetone-insoluble polymer of methyl methacrylate having a softening point in excess of 135° C. is produced in good yield.

The following examples will more clearly explain this invention but are not to be deemed as limiting its scope.

In performing the instant invention the reaction is carried out under a blanket of an inert atmosphere to insure that the catalyst doesn't react with oxygen, moisture or other contaminants. In the examples stated herein, pure dry lamp grade nitrogen is used as the inert atmosphere, however, the noble gases, especially argon and helium are equally suitable.

Example 1

A 500 ml. round bottom flask fitted with stirrer, condenser, thermometer, nitrogen inlet tube and neoprene diaphragm for admission of hypodermic needles was charged under a nitrogen blanket with 0.02 mole of redistilled methyl methacrylate monomer. The flask was immersed in a Dry Ice acetone bath (minus 20° C.) and 0.004 mole triisobutyl aluminum was added thereto by hypodermic syringe with agitation. After two minutes additional triisobutyl aluminum (0.004 mole) was charged to the flask. Additional Dry Ice was added to the bath to depress the temperature to minus 45° C. followed by the addition of 0.016 mole of triisobutyl aluminum. After about 5 minutes partial solidification of the flask contents occurred in the form of discrete particulates. At this point 0.17 mole of methyl methacrylate monomer was added slowly over a 45 minute period so that temperature stability could be maintained. The flask was removed from the temperature control bath and allowed to warm up to room temperature, i.e. approximately 28° C. After 15 minutes at 28° C. the temperature increased spontaneously to 45° C. for 10 minutes and then fell to 28° C. at which time the reaction was terminated. The polymerization reaction was carried out over a period of one and one half hours. The customary 100 ml. methyl alcohol were added to the flask to decompose the catalyst. The solid polymer was filtered, ground in a Waring blendor with additional methyl alcohol and dried. The dried polymer product weighed 9.5 g. The product was refluxed for 1 hr. in 50 ml. acetone cooled to room temperature and filtered. The dried acetone-insoluble portion weighed 6.5 and had a softening point in the range 145–160° C. The softening point of this acetone-insoluble polymer product is characteristic of polymethyl methacrylate which is more crystalline and more stereospecific than polymer prepared by radical initiation. The polymerization rate $$\frac{\text{g. polymer}}{\text{g. catalyst} \times \text{reaction time (hr.)}} = \frac{6.5}{4.75 \times 1.5}$$

of the acetone-insoluble polymer product was 0.91. The acetone-soluble polymer product was precipitated from solution with methyl alcohol, filtered and dried. The dried acetone-soluble polymer product weighed 3.0 g. and had a softening point in the range 135–140° C. The overall polymerization rate of the system was 1.33.

Example 2

Using the procedure and proportion of reactants of Example 1 except that ethyl methacrylate monomer was substituted for methyl methacrylate resulted in an acetone-insoluble polyethylmethacrylate having a softening point in excess of about 85° C. with a comparable polymerization rate.

To point up the increase in polymerization rate obtained by the instant invention over systems wherein the temperature is relatively constant the following run was made.

Example 3

The proportions of reactants and procedure of Example 1 were followed except that the reaction was maintained at a temperature of minus 45° C. whereat a solid phase appeared. After one and one half hours the polymerization reaction was discontinued and the polymer product separated into acetone-soluble and insoluble portions as in Example 1. The dried acetone-insoluble portion weighed 1.4 g. and softened at 145–160° C. The polymerization rate of the acetone-insoluble polymer product was 0.19. The dried acetone-soluble polymer product weighed 0.6 g. and had a softening point of 135–140° C. The overall polymerization rate for the system was 0.28.

Comparing Example 1 with Example 3 shows that although the presence of a solid phase yields a product which is greater than 65% acetone-insoluble, the polymerization rate of the acetone-insoluble portion is increased more than 400% when the temperature is increased after initiating a solid phase.

*Example 4*

Using the equipment of Example 1, 0.19 mole methyl methacrylate and 0.032 mole of aluminum triisobutyl were charged to the flask under a nitrogen blanket at 28° C. After a two hour polymerization reaction with agitation at 28° C. during which time no solid phase appeared, the reaction was discontinued and the product separated. The entire polymer product (4.75 g.) was acetone-soluble and had a softening point of about 125° C.

Example 4 shows the necessity of initiating the reaction between 0° C. and the melting point of the catalyst-monomer mixture in order to obtain an acetone-insoluble product.

*Example 5*

The proportions of reactants in procedure of Example 1 were followed except that 0.19 mole methylmethacrylate were added en masse to the flask at minus 45° C., following the addition of 0.024 mole triisobutyl aluminum with stirring. No solid phase was formed. The reaction was continued at minus 45° C. for 90 minutes and thereafter the Dry Ice-acetone bath was removed and the flask allowed to come to room temperature, i.e. 25° C. After 15 minutes the temperature rose spontaneously to 35° C. The reaction was continued for an additional 15 minutes, at which time the flask had cooled to room temperature. The product was worked up and separated into acetone-soluble and acetone-insoluble portions as in Example 1. The acetone-soluble methylmethacrylate polymer weighed 6.2 grams and had a softening point of 115–125° C. The acetone-insoluble polymer product weighed 0.7 gram, and had a melting point of 130–140° C. The polymerization rate of the acetone-insoluble portion was 0.098. Overall polymerization rate of the system was 0.98.

Example 5 shows that under the same conditions as in Example 1, but absent a solid phase, only 10% of the product is acetone-insoluble, and the polymerization rate of the acetone-insoluble portion is only about 11% of that obtained in Example 1.

The following example shows the effect of a solvent on the instant invention.

*Example 6*

Using the proportion of reactants and procedure of Example 1 except that the reaction was carried out in 100 ccs. normal heptane, resulted in no solid phase being formed at minus 45° C. After 2¼ hours the reaction was then allowed to come to room temperature. No further temperature increase was noted after 30 minutes stirring. The polymer product was worked up and separated into acetone-soluble and acetone-insoluble portions as in Example 1. The dried acetone-soluble polymer weighed 1.7 grams and had a softening point of 115–125° C. The acetone-insoluble portion of the polymer product weighed 0.2 gram and had a softening point of 125–135° C. The polymerization rate for the acetone-insoluble portion was 0.016 and the overall polymerization rate of the system was 0.146.

Example 6 shows the failure of the solid phase to form in the presence of a solvent with the resulting low acetone-insoluble polymerization rate (approximately 1.8% of that obtained in Example 1), and low percentage, i.e. 10.5% of acetone-insoluble polymer in the product.

In Example 1 supra, it is not necessary to initiate the polymerization at minus 20° C. and thereafter cool to minus 45° C. This is done merely to decrease the time prior to polymerization initiation.

Since polymerization rate varies directly with temperature, the higher temperature, i.e. minus 20° C., will initiate polymerization in a shorter period. Any temperature in the range between 0° and the freezing point of the catalyst-monomer mixture is operable as an initiating temperature. If desired, the reaction steps preceding the warming-up to room temperature can all be performed at a temperature between minus 45° C. and the freezing point of the catalyst-monomer mixture.

Once polymerization is started the reaction should be cooled immediately to about minus 45° C. whereat the solid phase occurs. The solid phase is present initially in the form of discrete particulates which act as nuclei for the growing polymer chains. The polymer formed on these nuclei at this lower temperature, i.e. about minus 45° C. has a stereospecific configuration which once started continues to propagate in this configuration even after warming up to about room temperature. Although at a temperature of about minus 45° C. a slow initial polymerization rate is realized, the solid polymer formed is more stereospecific than that at higher temperatures where no solid phase occurs, hence, the necessity for initially operating at these lower temperatures. Once the polymer is started in a solid phase stereospecific configuration, additional monomer may be added to build up the polymer in a stereospecific configuration. However, it should be noted that care must be exercised in the steps of charging additional monomer and warming the mixture.

It has been found that if the monomer is added too quickly the solid phase fails to form or if initiated, disappears, e.g. see Example 5. Thus, the polymer obtained after warming up to room temperature has a random configuration attested by the fact that it is predominantly acetone soluble and has a softening point of 125° C. or less.

This failure or disappearance may be due to the fact that since the monomer acts as a solvent for the polymer, the en masse addition of monomer solvent increases the amount of solvent to the point where it is sufficient to solubilize the polymeric solid phase. In addition, if the monomer to be added is not precooled to the reaction temperature, i.e. about minus 45° C., the increase in the reaction temperature caused by a gross addition of the monomer may also have a solubilizing effect on the solid phase polymer. As the solid phase is necessary in order to obtain predominantly stereospecific configuration and thus an acetone-insoluble polymer with a softening point above 135° C., it is preferred to add the monomer incrementally so as not to increase the temperature or solubility of the polymerization reaction mixture excessively and thereby eliminate the solid phase. Once the solid phase polymer formation is initiated at the lower temperature, the polymerization mixture is permitted to warm to room temperature whereat the polymerization rate of producing acetone-insoluble polymer is increased. It is preferred to allow the mixture to warm to room temperature without the addition of induced heat which may cause the disappearance of the solid phase.

The temperature range at which the solid phase polymer occurs is between minus 45° C. and the freezing point of the monomer-catalyst mixture. Although methyl methacrylate monomer freezes at about minus 50° C. the catalyst acts as a depressant on the freezing point of the catalyst-monomer mixture. The exact freezing point of the mixture is therefore dependent upon the catalyst concentration in the mixture.

The amount of aluminum trialkyl catalyst is not critical. A catalyst:monomer mole ratio of 1:3 to 100 respectively is operable, preferably 1:5 to 50 is employed.

Although the aluminum trialkyl used in the examples was aluminum triisobutyl the aluminum tri(lower alkyls) in general are operative to catalyze the polymerization of methyl methacrylate. Such other aluminum trialkyls include trimethyl, triethyl, tripropyl, triisopropyl, tributyl, triamyl, triisoamyl, trihexyl, triisohexyl, triheptyl, and trioctyl aluminum. Aluminum trialkyls wherein all of said alkyl groups have 1 to 8 carbon atoms are effective as catalysts in the instant invention.

The acetone-insoluble methyl methacrylate polymer produced by the present invention can be used in the same manner and means as the stereospecific methyl methacrylate polymer in the prior art. Such uses include molded and extruded articles of commerce e.g., signs, automotive ornaments, instrument panel parts, reflectors, and the like. In addition, the acetone-insoluble methacrylate polymers obtained by the practice of the instant invention are more useful than conventional polymethyl methacrylate because of their improved thermal properties, improved solvent resistance and improved orientability and can be used where these improved properties are a requisite.

The acetone-insoluble polyethyl methacrylate of the instant invention can be used in finishes.

I claim:

1. The process of polymerizing methyl methacrylate to form acetone-insoluble polymethyl methacrylate having a softening point in the range 135–160° C. which comprises forming in an inert atmosphere a polymerization mixture consisting essentially of methyl methacrylate monomer and a catalytic amount of an aluminum trialkyl wherein the alkyl groups contain 1 to 8 carbon atoms at a temperature between 0° C. and the freezing point of the mixture, adjusting the temperature of the mixture to between minus 45° C. and the freezing point of the mixture whereat a solid phase is formed and thereafter adding additional methyl methacrylate monomer incrementally while maintaining said solid phase present.

2. The process according to claim 1 wherein the catalyst monomer mole ratio is in the range 1:3 to 100 respectively.

3. The process according to claim 1 wherein the aluminum trialkyl is aluminum triisobutyl.

4. The process of polymerizing ethyl methacrylate to form acetone-insoluble polyethyl methacrylate having a softening point of about 85° C. which comprises forming in an inert atmosphere a polymerization mixture consisting essentially of ethyl methacrylate monomer and a catalytic amount of an aluminum trialkyl wherein the alkyl groups contain 1 to 8 carbon atoms at a temperature between 0° C. and the freezing point of the mixture, adjusting the temperature of the mixture to between minus 45° C. and the freezing point of the mixture whereat a solid phase is formed and thereafter adding additional ethyl methacrylate monomer incrementally while maintaining said solid phase present.

References Cited in the file of this patent

UNITED STATES PATENTS

| | | |
|---|---|---|
| 2,377,095 | Muskat | May 29, 1945 |
| 2,400,477 | Atwood | May 21, 1946 |

FOREIGN PATENTS

| | | |
|---|---|---|
| 566,713 | Belgium | July 31, 1958 |
| 833,579 | Great Britain | Apr. 27, 1960 |